(No Model.)
N. A. T. JONES.
FEED WATER HEATING AND PURIFYING APPARATUS.
No. 294,786. Patented Mar. 11, 1884.
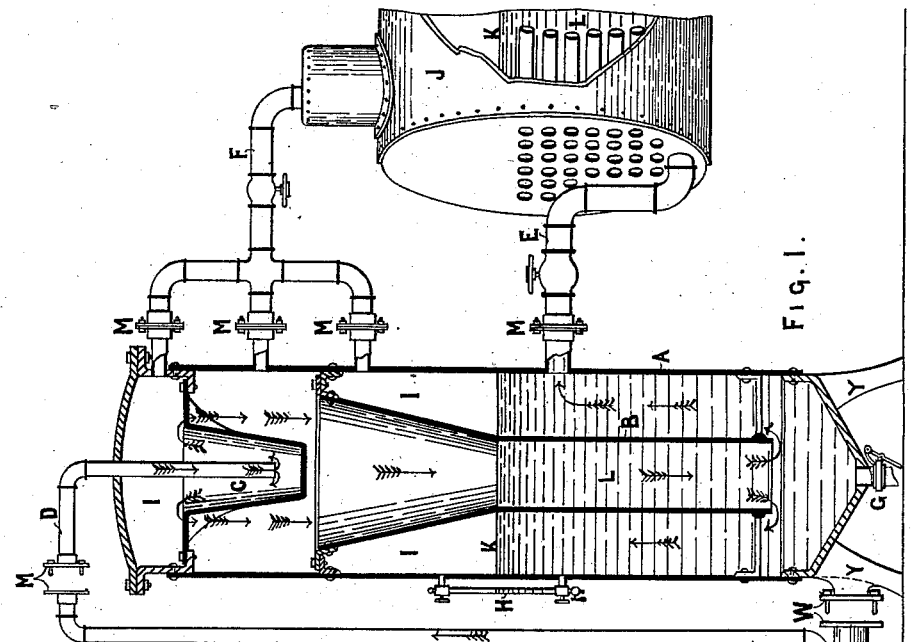
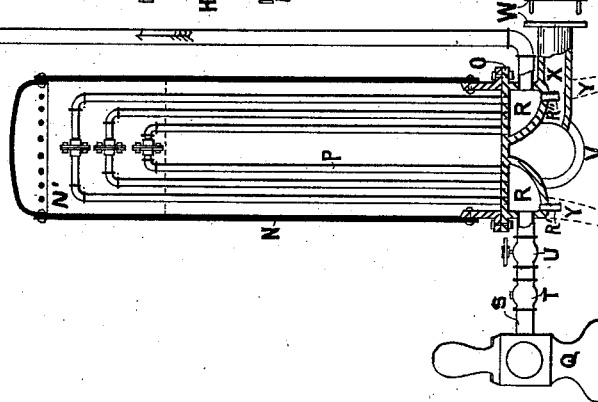
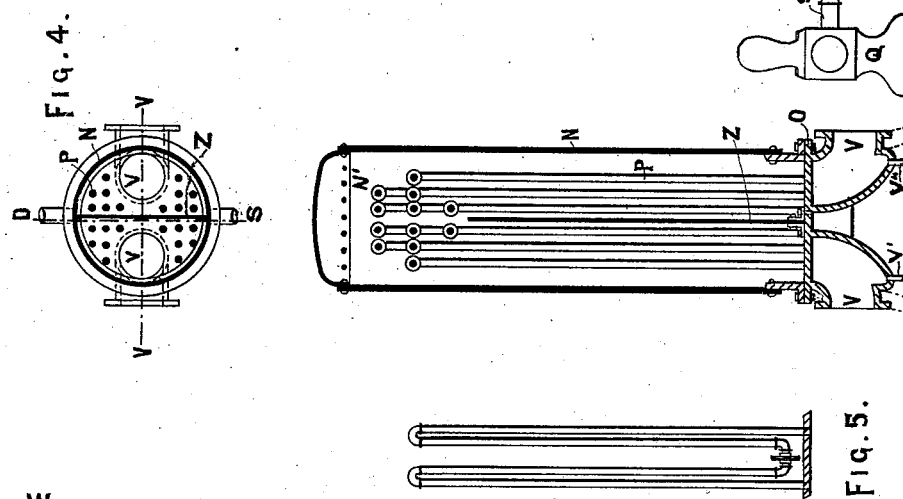
WITNESSES
Chas. W. Foote
Samuel Masters
INVENTOR
N. A. T. Jones

UNITED STATES PATENT OFFICE.

N. A. T. JONES, OF PLYMOUTH, MASSACHUSETTS.

FEED-WATER HEATING AND PURIFYING APPARATUS.

SPECIFICATION forming part of Letters Patent No. 294,786, dated March 11, 1884.

Application filed November 23, 1883. (No model.)

*To all whom it may concern:*

Be it known that I, N. A. T. JONES, a citizen of the United States, residing in Plymouth, in the county of Plymouth and the State of Massachusetts, have invented a new and useful Improvement in Feed-Water Heating and Purifying Apparatus, of which the following is a specification.

My invention relates to an apparatus for heating and purifying water, where live and exhaust steam may be used in combination, or either may be used independent of the other, for the purpose of heating and purifying water for steam-boilers and other purposes. I attain these results by the mechanism illustrated in the accompanying drawings, in which—

Figure 1 is a longitudinal sectional view of the live-steam portion of my apparatus, showing a steam-boiler connected to it by the necessary water-pipe E and live-steam pipe or pipes F. Fig. 2 is a longitudinal sectional view of the exhaust-steam portion of my apparatus on the line S and D, Fig. 4, showing the water-chambers R R in the base, the tube-sheet, the bent water-pipes P, connected at the top by union-joints, and the exhaust-steam chamber N' inside the shell N. Fig. 3 is another longitudinal sectional view on the line V V, Fig. 4, of the exhaust-steam portion of my apparatus, showing the exhaust-steam passages V V, with condense-steam chambers and drip-pipes V' V'' in the bottom of exhaust-steam chambers in the base, and the bent water-pipes P, the metal partition Z, dividing the exhaust-steam passages and forcing the exhaust steam to pass up on one side of it and down on the other, and the exhaust-steam chamber N' in the shell of the apparatus. The base and tube-sheet of the exhaust-steam portion of the apparatus are cast all in one piece. Fig. 4 is a top view of the base and tube-sheet as it appears after the removal of the shell from the base. Fig. 5 is a view of one of the bent water-pipes P, showing a return-bend at top connected by a union-joint near the tube-sheet.

Similar letters refer to similar parts throughout the several views.

In Fig. 1, (or live-steam portion of my apparatus,) A is the shell, with dishing bottom and removable cover; B, a removable cylindrical water-guide, funnel shape, and much larger at its top than the top of the overflow-pail, extending from any desired position above the water-line in the live-steam space I down nearly to the bottom of the apparatus, and its top secured to the shell by lugs and screw-bolts, or other suitable fastening device, the bottom supported by a metal ring, which is secured to the shell by two or more arms extending from it; C, a removable deep overflow-pail secured near the top of live-steam space by lugs and screw-bolts. The pail C may be made with a perforated bottom, and loosely packed with any material which will allow the circulation and free passage of the water through it, thereby separating it and subjecting it for a longer time to the action of the live steam. D is the inflow-pipe, extending nearly to the bottom of the pail C, when used as an overflow-pail; but when a perforated bottom is used, the inflow-pipe D discharges the water at the top above the material with which the pail is packed. E is the outflow pipe and valve; F, the live-steam pipe or pipes; G, the blow-off pipe and lever-valve; H, the water-gage; I, the live-steam space; J, a steam-boiler with a portion of the shell broken away; K, water-line in both boiler and heater; L, water-space in both boiler and heater; M, union-joints; Y, the legs.

In Figs. 2 and 3, (or exhaust-steam portion of my apparatus,) N is the shell forming the exhaust-steam chamber N', secured to the base by bolts or other suitable fastening device; O, the base with exhaust-steam passages V V, water inlet and outlet, water-chambers R R, blow-off pipes R' R'', legs Y Y, and tube-sheet with the bent water-pipes P, securely riveted or screwed into it. P represents a group of small pipes situated directly over the water-chambers, forming a direct and the only communication between the inlet and outlet water-chambers. Said pipes are connected at the top by union-joints, or may be formed with a return-bend at top and carried down and connected by union-joints near the tube-sheet, as shown in Fig. 5. Q is the pump or injector; R R, the two water-chambers, each separate from the other in the base, the only communication between them being through the group of small bent water-pipes P; S, the inflow-pipe; T, check-valve; U, globe-valve; V V, Fig. 3, the exhaust-steam passages, showing the condense-steam chambers and drip-pipes V' V'' at bottom of exhaust-steam chambers; Y Y, Fig. 2, legs; Z, Fig. 3, a metal partition secured to the tube-sheet and extending nearly or quite to the top of the bent water-pipes P, between the exhaust-steam inlet and outlet, forcing the exhaust-steam to pass up on one side of it and down on the other, submerging the group of water-pipes in its passage up and down. X, Fig. 2, is a support cast onto the base and connects at W with Fig. 1, when Figs. 1 and 2 are used in combination; but when used separately, the support X and flange W are omitted on both Figs. 1 and 2.

Like letters apply to Fig. 4.

The exhaust-steam portion of my apparatus is intended for heating the water to the utmost that it is possible to heat it with exhaust-steam, and partly separating the impurities from it. This I accomplish by dividing the water after passing into the inflow water-chamber through a single pipe, which may be from one to three inches in diameter, passing it from the inflow water-chamber through a large group of small pipes submerged in the exhaust-steam into the outflow water-chamber, from which it passes through a single pipe, the same size as the one by which it enters the inflow water-chamber. When used independent of the live-steam portion of my apparatus, it is intended for a water heater and purifier to the utmost extent that water can be purified by exhaust-steam. When used in combination with the live-steam portion of my apparatus, it is intended to impart to the water all the heat that it is possible to obtain from exhaust-steam, and partly separate the foreign matter from the water before passing it through pipe D into the overflow-pail C, so the condensation of live steam will be greatly diminished in the precipitation.

The precipitator, Fig. 1, can be used separate from any exhaust-steam heater, or in combination with any exhaust-steam heater that may be in use where it is desirable to use a precipitator. When the precipitator, Fig. 1, is used alone, the live steam from the boiler is admitted into it through pipe or pipes F, the water through pipe D into the overflow-pail C and discharged near its bottom, so that a large body of the water is held suspended in the live steam and heated to nearly the same temperature as the live steam before overflowing in a thin sheet and falling into the water-guide B, through the entire length of which it must pass before it can rise to flow into the boiler through outflow-pipe E. The extreme heat that the water is subjected to in its passage through the live steam separates all the impurities that are liable to form scales or incrustations in boilers, from it. These impurities settle at the bottom, and are blown off through the blow-off pipe G, and the water is delivered to the boiler at a temperature nearly equal to that in the boiler, and entirely free from foreign matter liable to incrust it.

An important feature in the exhaust-steam portion of my apparatus is the dividing of the water after it passes into the inflow water-chamber, and passing it through a large number of small pipes that are submerged in the exhaust-steam instead of passing it through a single large coil or return-bend pipe, as was formerly the case.

Important features in the live-steam portion of my apparatus are the providing of a large steam-space to secure a thorough separation of the foreign matter, and sufficient water-space to insure its entire precipitation, thereby delivering the water to the boiler at a very high temperature, and perfectly preventing the possibility of incrusting the boiler, and almost entirely preventing the expansion and contraction of the tubes in the boiler by the extreme heat that the water is delivered to it; the large overflow-pail which holds a large body of water suspended in the live steam and subjected to its extreme heat before overflowing in a thin sheet all around the top of the pail directly into the live steam; the long water-guide, the top of which is funnel shape and much larger than the overflow-pail, so that all the water overflowing from the pail is caught by it and must pass its entire length, depositing the separated foreign matter in the bottom of the precipitator over the blow-off pipe, through which it is blown off, the water rising to the outflow-pipe E, through which it flows into boiler entirely freed from all injurious matter. Both the overflow-pail C and the water-guide B are removable, and can be easily taken out for cleaning and repairs. Other important features in both the exhaust and live steam portions of my apparatus are the simplicity of construction, the ease with which they can be repaired in case of accident, the efficiency of their work, and their operation, which is simple and easy.

I am aware that bent pipes, secure at both ends, have been used in heaters and condensers, also that live steam has been used in heaters where there was a free passage for the water between the heater and boiler, and the water-line in both was the same—as, for instance, in a former heater of my own patented November 6, 1877, No. 196,808—so I do not claim either, broadly; but I do claim—

1. In a water heating and purifying apparatus, the combination of the base O, the water-chambers R R, the blow-off pipes R' R'', the exhaust-passages V V, with condense-chambers and drip-pipes V' V'' in the bottom, and tube-sheet and base cast all in one piece, the shell N, the exhaust-steam chamber N', the group of bent water-pipes P, each pipe connected in its center by a union-joint, one end of which communicates with the inflow water-chamber, and its other end with the outflow water-chamber, forming a direct water communication from one water-chamber to the other through the group of small water-pipes P, substantially as shown and described.

2. In a water heating and purifying apparatus, the combination of the reservoir A, the removable water-guide B, the deep removable overflow-pail C, the inflow-pipe D, the outflow-pipe E, the live-steam pipe or pipes F, the blow-off pipe G, all provided with suitable valves, and glass water-gage H, substantially as shown and described.

3. In a water heating and purifying apparatus, the combination of the base O, the water-chambers R R, the blow-off pipes R' R'', the exhaust-passages V V, with condense-chambers and drip-pipes V' V'' in the bottom, and the tube-sheet and base cast all in one piece, the shell N, and the exhaust-steam chamber N', the group of bent water-pipes P, each pipe connected in its center by a union-joint, one end of which communicates with the inflow water-chamber, and its other end with the outflow water-chamber, forming a direct water communication from one water-chamber to the other, through the group of small water-pipes P, the reservoir A, the removable water-guide B, the deep removable overflow-pail C, the inflow-pipe D, the outflow-pipe E, the live-steam pipe or pipes F, the blow-off pipe G, all provided with suitable valves, and glass water-gage H, substantially as shown and described.

In testimony that I claim the foregoing as my own I have hereunto affixed my signature in presence of two witnesses.

N. A. T. JONES.

Witnesses:
J. E. DAVIDS,
O. J. JOHNSON.